United States Patent [19]

Walter

[11] Patent Number: 4,745,703
[45] Date of Patent: May 24, 1988

[54] SEINE NET DEVICE

[76] Inventor: Ronald P. Walter, 133 Hillside Dr., Reedsville, Pa. 17084

[21] Appl. No.: 23,151

[22] Filed: Mar. 9, 1987

[51] Int. Cl.⁴ .............................................. A01K 43/12
[52] U.S. Cl. ...................................................... 43/14
[58] Field of Search ................................ 43/14, 11, 7

[56] References Cited

U.S. PATENT DOCUMENTS

| | | | |
|---|---|---|---|
| 614,706 | 11/1898 | Dize | 43/7 |
| 3,548,531 | 12/1970 | Holden | 43/11 |
| 3,699,700 | 10/1972 | Kinsell | 43/14 |
| 3,747,250 | 7/1973 | Willinger | 43/11 |
| 4,043,380 | 12/1977 | Grim | 43/11 |
| 4,653,214 | 3/1987 | Cline | 43/14 |

Primary Examiner—Gene P. Crosby
Attorney, Agent, or Firm—Thomas E. Sterling

[57] ABSTRACT

A minnow seine net having a collapsible tripod-like frame consisting of three poles joined by an adjustable connecting structure permitting the tripod to be folded into a handy, easy to carry form. A seine net is attached to and spread between the forward two legs of the tripod. This net has floats attached to the upper portion thereof and sinkers on the lower portion. The net is adapted to be placed in a stream or other body of water and is adapted to the catching of minnows, bait fish or other fish bait.

10 Claims, 3 Drawing Sheets

SEINE NET DEVICE

PRIOR ART STATEMENT:

A preliminary patent search by the inventor has revealed U.S. Pat. No. 3,699,700. The inventor does not know of other patents which are substantially similar to the device described in this patent application.

This invention relates to seine nets and in particular to nets adapted to catch and trap minnows or other fish and which can be placed in the water in a self-supporting position without the attendance of a supporting person.

BACKGROUND OF THE INVENTION

At the present time, the general method of gathering minnows or fish bait is through the use of minnow seine poles with a relatively small seine or net approximately four feet square and wherein the left and right marginal edges are mounted on a pair of poles. This device is manipulated by pushing or scooping into the water in front of the user. The disadvantage of this device is that minnows and fish bait are frightened by the presence of the operator of the net therefore fleeing that location and making the capture of said minnows and fish bait very difficult. Another more successful means of using the seine net was to enlist the help of another person to chase the minnows or disturb the stream bottom upstream from said seine net operator thus producing a more productive catch. However, two people are required for this operation and the minnows and fish bait are still frightened by the operator of the seine net.

To overcome the shortcomings of the existing methods, the present invention is developed to produce an effective means for a single operator to chase said minnows or disturb the streambottom thereby herding the minnows or fish bait into said device. The device is also small and compact and easily portable from one place to another. The net is not only of requisite size, weight and mesh, it lends itself to free standing operation by the user.

The present invention is a device that to the ends desired comprises a pair of like elongated hollow legs having forward leading ends and rearward trailing ends and wherein the rearward ends are bent in a means of directing both rearward ends to a connecting means. At such means a third elongated leg of approximately the same length, as the pair of like elongated legs, is also attached to said means. Thereby providing a means by which the pair of like elongated legs may be supported in a tripod type fashion. Side lines attached to the minnow net are positioned inwardly of the respective pair of like elongated legs and tied to said legs at the appropriate locations to provide a hitching means.

More specifically, novelty is predicated in part on the collapsible tripod like means for having a seine net attached for the purpose of gathering, catching or entrapping minnows, fish bait or bait fish and upon the unique connecting means.

Persons conversant with the art to which the invention relates are aware that various portable surf fishing nets are known but are comparatively complicated and expensive or require two or more persons to operate effectively, for which reason it is an objection of the present invention to provide a self-supporting net or seine construction which lends itself to appropriate use for gathering or entrapping minnows, bait fish or fish bait.

It is an object of this invention, therefore, to provide a minnow seine net which is self-supporting.

It is another object of this invention to provide a minnow seine net which may be easily collapsed, transported and stored easily.

It is still another object of this invention to provide a minnow seine net of a tripod type having a unique adjustable connected means between the three legs of the tripod.

Another object of this invention is to provide a locking ratchet type connecting coupling between the front legs which will allow these to be selectively adjusted to a chosen angle.

It is another object of this invention to provide a tripod type minnow seine net in which the three legs of the tripod are adjustable.

Another object of this invention is to provide a self-supporting minnow seine net which may be operated by one person who drives or encourages the minnows or other bait fish to enter the net.

It is yet another object of this invention to provide a minnow seine net which may be easily lifted from the water now containing the trapped minnows.

These and other objects of this invention are more specifically set forth in the following specification and claims having drawings in which:

Figure 1:
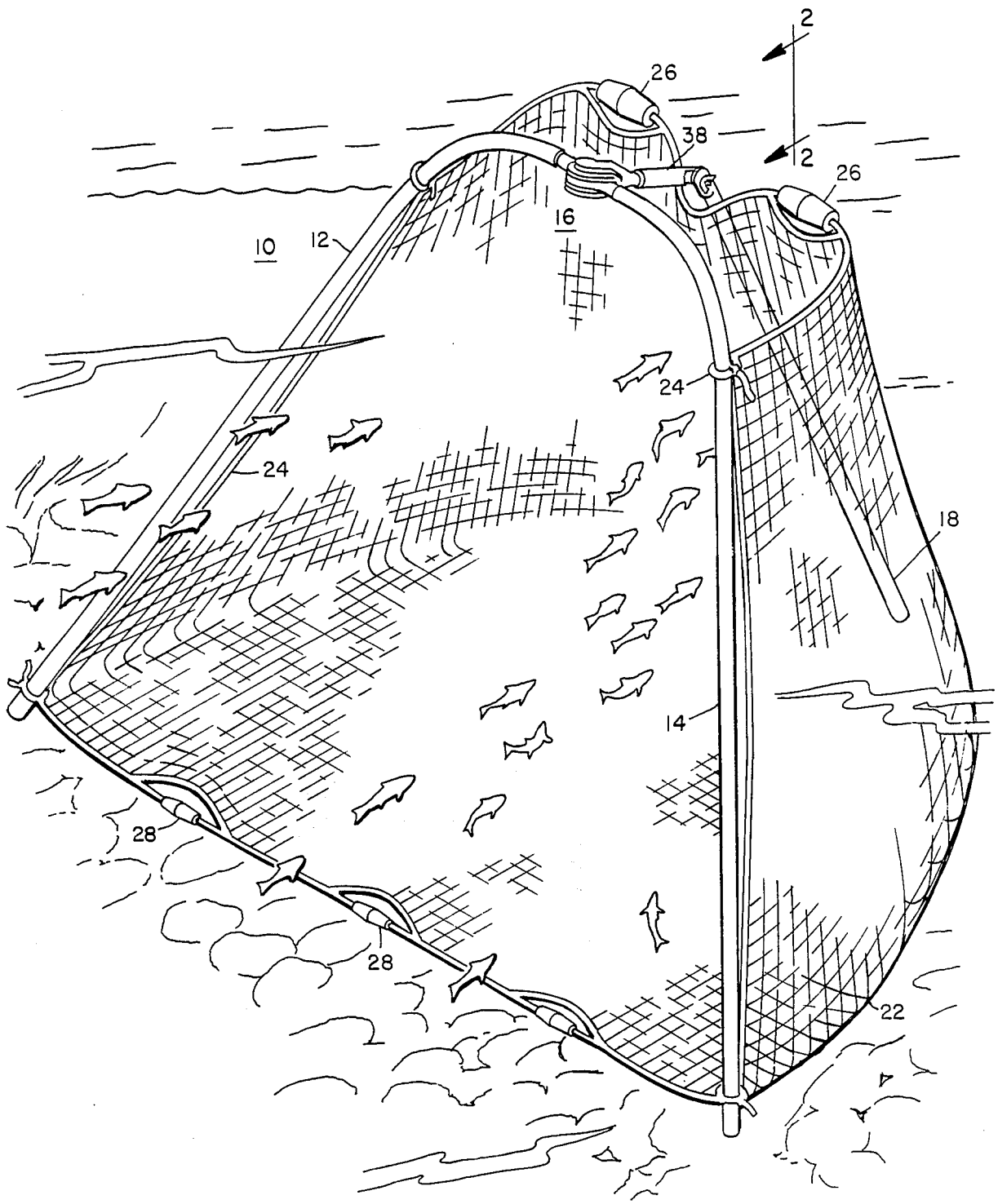
FIG. 1, is a third dimensional drawings of the present invention showing the minnow seine net self-supporting within a stream or other body of water.

Referring to the drawings, and in particular to FIG. 1, 10 represents the minnow seine net device having front legs 12 and 14 pivotally connected to a connecting coupling 16. Rear leg 18 is also pivotally connected to the connecting coupling 16. Front legs 12 and 14 and rear leg 18 are comprised of hollow tubular members open at the bottom ends.

A seine net 22 having a side line 24 attached to and extending around its periphery, is tied to the upper and lower portion of front leg 12 and front leg 14 by means of the side line 24. Side line 24 extends through water floats 26 positioned on the upper portion of the seine net 22 between front legs 12 and 14. The side line 24 on the bottom portion of the seine net 22 extends through sinkers 28. These sinkers 28 are positioned between front legs 12 and 14 and cause the lower portion of the seine net 22 to stay on the bottom while the net is in the water. Floats 26 float the upper portion of seine net 22 in the water. The seine net 22 is so attached that when it faces the current of a stream it will billow backward in a parachute like fashion forming an enclosure for minnows to be trapped.

Figure 2:
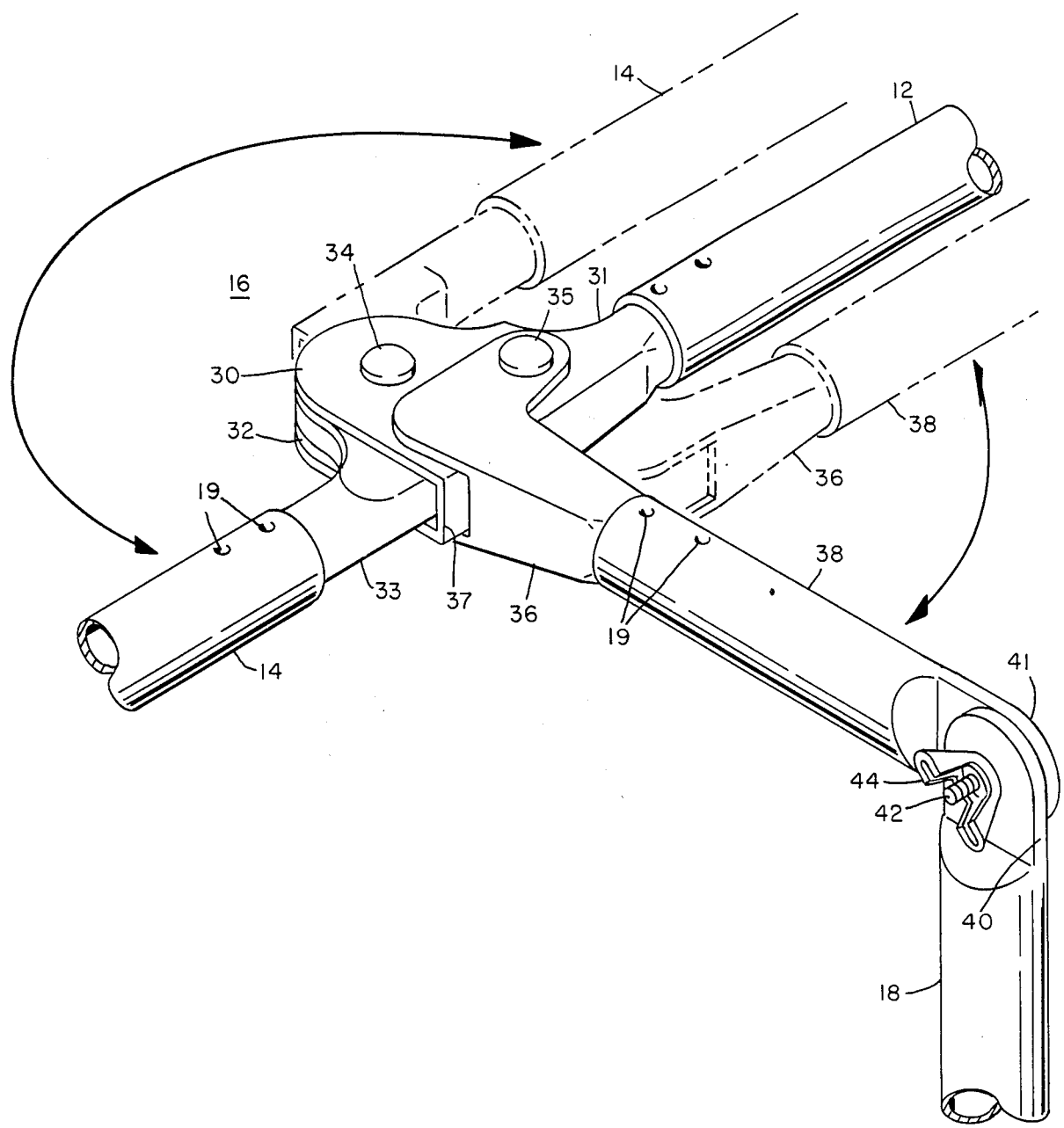
FIG. 2, is a third dimensional view of the invention taken along lines 2—2 of FIG. 1, showing the first mode of the leg connecting coupling of the minnow seine net device in various positions.
Figure 4:
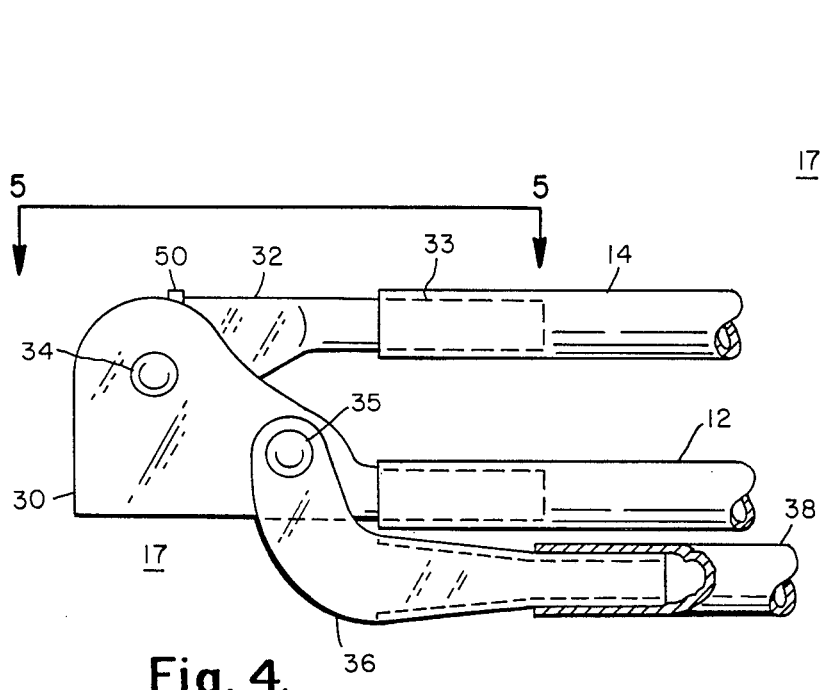
FIG. 4, is a view of the invention taken along lines 4—4 of FIG. 3 showing a second mode of the connecting mechanism of the device.

The connective coupling is comprised of two modes or modifications. The first mode, connecting coupling 16 is pictured in FIG. 2. This permits rotation of front legs 12 and 14 until they are approximately in a straight line position. The second mode, connecting coupling 17 pictured in FIG. 4 and FIG. 5 contains an internal locking mechanism 20 (FIG. 5) which allows the front legs 12 and 14 to be locked in position at varying angles with one another. This locking mechanism is comprised of later described parts curved cam 48, dog 56 and spring 58. The first mode (FIG. 2) contains no internal locking mechanism 20.

Figure 3:
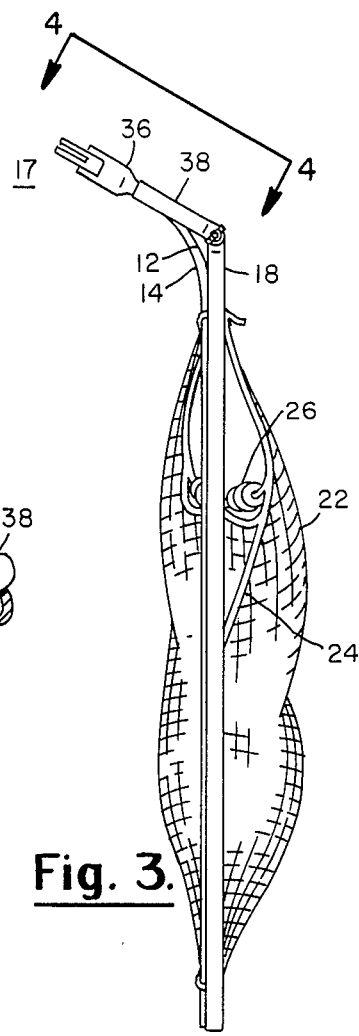
FIG. 3, is a third dimensional view of the present invention in its folded or collapsed position.

The first mode, the connecting coupling 16 of this device is comprised of a U-shaped outer frame 30 having a cylindrical end portion 31 adapted to be coupled to the end portion of tubular front leg 12 and remain permanently attached thereto by dimples 19, crimping or of other means. An inner frame 32 is positioned within the U-shaped outer frame 30 and is pivotally attached thereto by a frame pivot pin 34 extending through the outer frame 30 and the inner frame 32. Inner frame 32 has a cylindrical end portion 33 adapted to fit within tubular front leg 14 and become permanently attached thereto by dimples 19. Inner frame 32 is adapted to rotate about frame pivot pin 34 within U-shaped outer frame 30 but is restrained from further rotation when it bears against back plate 37 of U-shaped outer frame 30 when cylindrical end portions 31 and 33 are in an approximate straight line. Thus front legs 12 and 14 are likewise restrained from further rotation when they are in approximate straight line relationship. It should be noted that front legs 12 and 14 may be rotated about frame pivot pin 34 so that they are in an approximate side-by-side relationship thus allowing the device to be easily collapsed in a readily portable form as shown in FIG. 3.

A U-shaped rear frame 36 having a cylindrical rear portion 38 is positioned to extend about U-shaped outer frame 30. A rear pivot pin 35 extends through U-shaped rear frame 36 and outer frame 30 allowing rear frame 36 to pivot about outer frame 30 in approximately the same plane as inner frame 32 pivots about outer frame 30. Rear pivot pin 35 is generally a rivet although a bolt or other pinning device may be used.

The upper portion of rear leg 18 and the rear portion of cylindrical rear portion 38 have flattened end portions 40 and 41 in contact with one another. A threaded rear pivot bolt 42 extends through flattened end portions 40 and 41. Wing nut 44 engages the threads of rear pivot bolt 42 allowing end portions 40 and 41 to be clamped together in a rigid predetermined angle to support minnow seine net 10. Rear leg 18 may thus rotate about rear pivot bolt 42. Rear leg 18 therefore can be adjusted appropriately to support the device on the bottom. It should be noted that U-shaped rear frame 36 may be rotated about frame pivot pin 34 so that rear leg 18 is adjacent to front legs 12 and 14 (FIG. 3). Thus front legs 12 and 14 and rear leg 18 when adjacent and parallel to one another cause the device to be in the collapsed and portable position whereby it may be easily transported and be of small size.

The second mode of the connecting coupling 17 (FIGS. 4 and 5) may be used whereby a device contained therein will permit cylindrical end portions 31 and 33 to be positioned and locked when front legs 12 and 14 are at an angle of less than 180 degrees.

Figure 5:
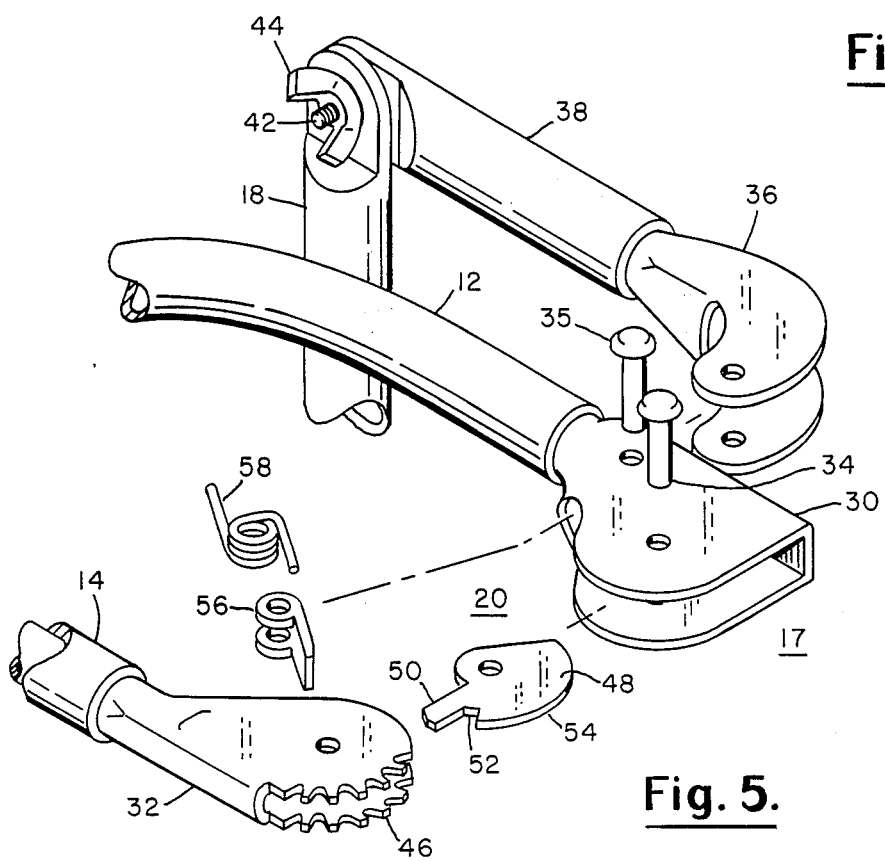
FIG. 5, is a third dimensional disassembled view of the invention taken along lines 5—5 of FIG. 4 showing the second mode of the connecting mechanism of the device.

FIG. 5 illustrates a second mode of the device in which the connecting coupling 17 contains an internal mechanism whereby the cylindrical end portions 31 and 33 can be adjustably locked in several positions at an angle of from about 90 to 180 degrees. Attached front legs 12 and 14 may then be thus positioned at an angle of 90 to 180 degrees thus allowing the distance between front legs 12 and 14 to be adjusted and billowing of seine net 22 to be increased to suit the water conditions.

In this second mode, the portion of inner frame 32 within U-shaped outer frame 30 has a toothed curved section 46 within which is positioned a curved cam 48 through which frame pivot pin 34 passes. Curved cam 48 may rotate about pivot pin 34. Curved cam 48 has a protrusion 50 and an adjacent notch 52 at the end portion of its curved edge 54. A bifurcated dog 56 is pivoted about rear pivot pin 35 within inner frame 32 and is biased by coiled spring 58 to bear against and engage toothed curved section 46. Spring 58 enclosed within bifurcated dog 56 has rear pivot pin 35 extending therethrough.

In operation of the second mode, connecting coupling 17 is extended so that front legs 12 and 14 are in an approximate straight line. In this position dog 56 is positioned within notch 52 and in engaging contact with toothed curved section 46. Legs 12 and 14 are then rotated inward causing dog 56 to engage succeeding teeth in toothed curved section 46, locking legs 12 and 14 against outward rotation at a predetermined angular position with one another. When legs 12 and 14 are rotated to the end of toothed curved section 46, dog 56 is camed outward by curved edge 54 beyond toothed curved section 46 so that dog 56 does not engaged toothed curved section 46. Legs 12 and 14 may then rotate freely on curved edge 54 until they are parallel to one another and in a folded relationship.

When legs 12 and 14 are again rotated outward, protrusion 50 will be pushed by inner frame 32 to rotate curved cam 48 till dog 56 falls into notch 52 and again contacts and engages toothed curved section 46. The process will then repeat, allowing legs 12 and 14 to be positioned and locked against outward rotation at a selected angle with one another.

The minnow seine net device 10 is usually transported in the collapsed or closed position whereby front legs 12 and 14 and rear leg 18 are adjacent to one another. The seine net 22 may be wrapped about or between these legs thus adding to the compactness of the entire device. This compact and collapsed device is thus transported to the stream, or other body of water. Front legs 12 and 14 are then rotated in an approximate straight line or selected angular position about frame pivot pin 34, rear leg 18 thru U-shaped rear frame 36 is rotated about rear pivot pin 35 until rear leg 18 is approximately perpendicular to the cylindrical end portions 31 and 33. It should be noted that at this point, rear frame 36 bears against back plate 37 of outer frame 30 and will rotate no further.

Rear leg 18 is then pivoted about rear pivot bolt 42 to the proper amount allowing front legs 12 and 14 and rear leg 18 to form a tripod supported on the bottom. Seine net 22 then extends between front legs 12 and 14 to form a parachute or bag-like opening. In a moving stream the device is usually positioned so that the current will pass between front legs 12 and 14 causing the seine net to billow backward and to carry minnows or other bait fish in contact with the seine net 22.

At this point it should be noted that the device is supporting itself and requires no further manual support. The fisherman (not shown) may walk on the upstream portion of the device, to drive or encourage minnows or other bait fish to swim into the billowing seine net 22. Floats 26 keep the upper portion of the seine net 22 floating on the surface and sinkers 28 anchor the lower portion of the seine net 22 on the bottom. When a number of minnows or other bait fish have become entrapped in the seine net 22, front legs 12 and 14 may be rotated forward to contact one another and lifted out of the water. This causes the seine net 22 to lift the entrapped fish free of the water and where they may be removed from the net.

When use of the device has been completed, it may be transported to shore, folded in its collapsed positioned with the net 22 wrapped about parallel front legs 12 and 14 and rear leg 18 and transported elsewhere.

It should be noted that the minnow seine net device in its collapsed position occupies very little space and is easily transportable. The device in its operating position, in the stream or other bodies of water, supports itself without the need of any other outside support. Thus the fisherman is free to herd the minnows into the net or to engage in other activities while the net is fully operable.

The foregoing description of this invention is considered as illustrative only of the principle of the invention. Numerous modifications will readily occur to those skilled in the art, hence the invention is not limited to the exact construction and operation shown and displayed. All suitable modifications and equivalent may be utilized as falling within the scope of the invention.

I claim:

1. A portable submersible bait fish netting device, comprising in combination:
    two front legs;
    a connecting means attached to said two front legs, said connecting means comprising in combination:
        a bifurcated outer frame attached to one of said front legs;
        a bifurcated inner frame rotatably positioned within said bifurcated outer frame and attached to the other of said front legs;
        a pivot pin extending through said outer frame and said inner frame;
    rear leg means attached to said connecting means;
    a spreadable net attached to said two front legs and extending therebetween;
    water buoyant floats attached to the upper portion of said net;
    water sinkers attached to the bottom portion of said net.

2. The combination as claimed in claim 1, in which said rear leg means is comprised of, in combination:
    a bifurcated rear frame rotatably positioned about said outer frame;
    a rear pivot extending through said rear frame and said outer frame;
    a rear leg attaching means connected to said rear frame;
    a rear leg attached to said rear leg attaching means.

3. The combination as claimed in claim 1, in which said rear leg attaching means is comprised of, in combination:
    an extension member connected to said bifurcated rear frame;
    a rear pivot bolt extending through said rear leg and said extension member;
    a nut screwably attached to said rear pivot bolt and adapted to lock said extension member to said rear leg.

4. The combination as claimed in claim 1, in which said bifurcated inner frame is comprised of, in combination:
    a toothed curved section upon the periphery of said inner frame;
    a dog within said outer frame pivoted about said rear pivot in engaging contact with said toothed curved section;
    a spring within said outer frame pivoted about said rear pivot and in biasing contact with said dog;
    a cam with a notch therein within said inner frame, said cam pivoted about said pivot pin;
    a protrusion on said cam, said protrusion adapted to rotatably contact said inner frame.

5. The combination as claimed in claim 1, in which said pivot pin and said rear pivot are comprised of rivets.

6. The combination as claimed in claim 5, in which said dog contacts said toothed curved section, said cam and said notch in a sequentially rotating manner.

7. The combination as claimed in claim 1, in which said rear leg has a flat end portion thereon;
    a flat end portion upon said extension member in contact with flat end portion of said rear leg, said rear pivot bolt extending therethrough.

8. The combinatoin as claimed in claim 1, in which said two front legs and said rear leg are portably positioned parallel to one another, and said spreadable net is positioned therebetween said front and rear legs.

9. A stationary portable submersible bait fish self-supporting netting device, comprising in combination:
    two front legs having distal and proximal ends;
    a connecting means attached to said two front legs at the proximal ends;
    rear leg means attached to said connecting means;
    a spreadable net attached to said two front legs and extending therebetween;
    a flexible front bottom edge portion of said spreadable net extending between said two front legs;
    water buoyant floats attached to the upper portion of said net;
    water sinkers attached to said flexible bottom portion of said net.

10. The combination as claimed in claim 1, in which said flexible bottom portion of said net is comprised of a flexible line.

* * * * *